March 27, 1928.
L. W. CHUBB
1,664,243
MAXIMUM DEMAND METER
Filed Dec. 11, 1922
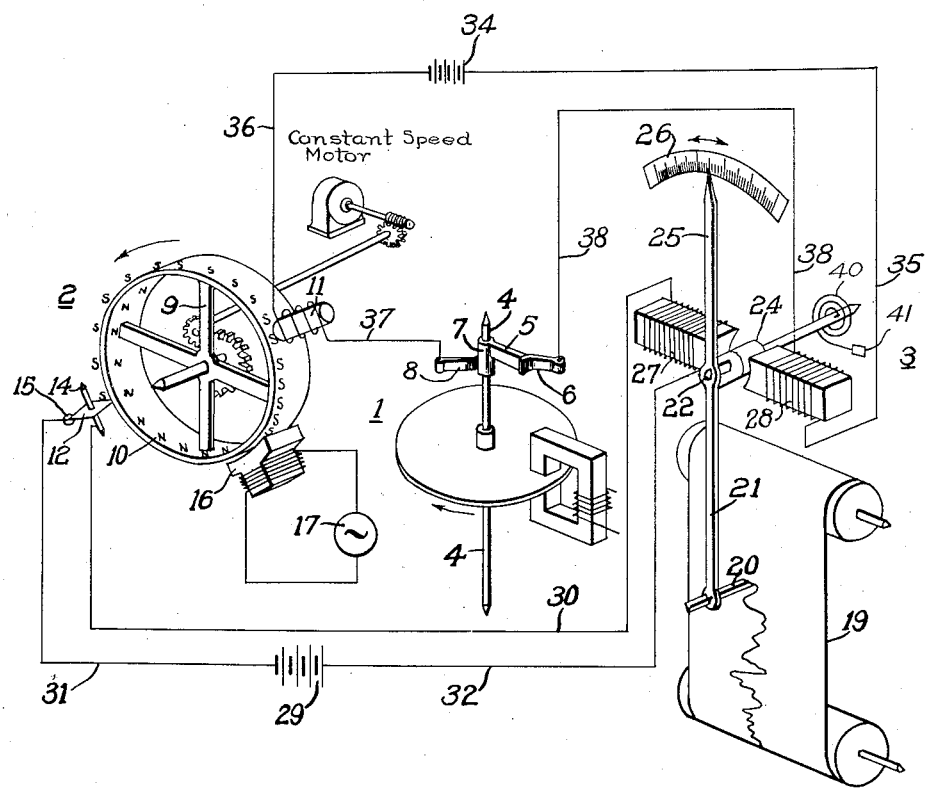
WITNESSES:
INVENTOR
*Lewis Warrington Chubb.*
BY
ATTORNEY Patented Mar. 27, 1928.

1,664,243

UNITED STATES PATENT OFFICE.

LEWIS WARRINGTON CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA.

MAXIMUM-DEMAND METER.

Application filed December 11, 1922. Serial No. 606,103.

My invention relates to electrical measuring instruments and particularly to meters for indicating or recording the maximum average energy demand for a given interval.

One object of my invention is to provide a device of the above indicated character that shall be relatively simple and inexpensive to construct and accurate in its operation.

Another object of my invention is to provide a demand meter that shall be adapted to indicate or record the integrated periodic demand of energy traversing the same.

Another object of my invention is to provide a demand meter that shall be actuated, at one stage of its sequence of operation in accordance with predetermined energy units.

A further object of my invention is to provide a demand meter that shall so employ a magnetizable member upon which consequent poles are induced as to greatly simplify the operation of comparing the power existing in a circuit at different periods without the employment of complicated mechanical structure.

Heretofore, it has been usual to provide graphic demand meters actuated in accordance with predetermined main time intervals, such as half hour intervals, beginning at set times by the clock. Such instruments, while indicating the average demand during the set intervals, are subject to considerable error in that the period of actual maximum demand may begin and end between the ends of the main intervals.

Various suggestions have been made to overcome the above-mentioned objections, such as instruments embodying a multiplicity of weight members that are successively shifted in accordance with increments of energy integrated over predetermined set sub-intervals. By reason of complication and mechanical limitation, such instruments have not been widely adopted because, while they reduced the error of the above-mentioned fixed-time interval meters, the error was still present by reason of the small number of weights which it was practical to employ.

In practicing my invention, I provide means at one position for inducing or forming a number of successive consequent magnetic poles on a movable magnetizable member in proportion to the number of revolutions of an integrating meter. Means are provided for co-operation with each of said poles at another position at a predetermined time interval, such as one half hour, after the formation of the successive poles which operate to move the indicating member or graphic stylus in one direction. This movement is opposed by a movement substantially in proportion to the instantaneous integrated value of the energy existing one half hour later than each instant represented on the magnetizable member upon which the consequent poles are induced. Thus, a half hour period may be observed beginning at substantially any instant and the half hour of actual maximum average demand more readily ascertained.

The single figure of the accompanying drawing is a diagrammatic view of an instrument embodying my invention.

My invention may comprise, in general, a watt-hour meter 1, a magnetic-pole-inducing mechanism 2 and a graphic or indicating instrument 3.

The watthour meter 1 may comprise any usual or suitable instrument having a shaft or member 4 actuated in accordance with the energy traversing a circuit (not shown). A movable contact-making arm or member 5 is mounted to rotate with the shaft 4 and to periodically energize a stationary contact member 6. The member 5 has a sleeve portion 7 for mounting on the shaft 4 and one end of which projects laterally to constitute a slip ring bearing for a stationary brush or contact member 8.

The mechanism 2 comprises a suitably-driven, constant-speed wheel member 9 having a perimetral portion or rim 10 constructed of magnetizable material upon which successive consequent poles are induced by an electromagnet 11. A polarized needle or switch arm 12 is pivoted on a pin or shaft 14 adjacent to the rim 10 at a position, relative to the speed of rotation of the wheel 9, one half hour behind the electromagnet 11, and is adapted to engage and disengage a stationary contact member 15 in accordance with the number and position of the induced magnetic poles on the rim 10.

An alternating-current electromagnet 16, energized from a source 17, or other suitable means, is provided to neutralize or erase the consequent poles effected by the electromagnet 11, after they have actuated the needle 12, to prepare the rim 10 for further co-operation with the magnet 11.

The instrument 3 comprises a movable record sheet 19 that is adapted, in a usual manner, to pass under a pen or stylus 20 carried by an arm 21. The latter is mounted on a shaft 22 upon which is also mounted a movable magnetizable member 24 and the arm 21 may further comprise an indicating arm portion 25 for co-operation with a scale 26.

The shaft 22 on which the pointer 25 and the magnetizable member 24 are mounted is biased to a zero position in any suitable manner, as, for example, by a spring 40 that is secured to the shaft 22 at a portion 41 of the stationary structure of the meter. The electromagnet 28, when energized, is adapted to turn the magnetizable member 24 in a clockwise direction, and the electromagnet 27, when energized, is adapted to turn the magnetizable member 24 in an opposite direction of rotation or in a counter-clockwise direction. Such a result may be effected in any suitable manner, as, for example, the magnetizable member 24 is provided with fixed north and south poles that are attracted by corresponding south and north poles in the electromagnet 28 and repelled by corresponding north and south poles of the electromagnet 27. When the electromagnets 27 and 28 are deenergized, the spring 40 biases the indicating member 25 to assume a position on the extreme left-hand side of the scale 26. An energization of the electromagnet 28 moves the pointer 25 in a clockwise direction over the face of the scale 26. Such action of the electromagnet 28 is neutralized by an energization of the electromagnet 27, and a spring 40 causes the pointer 25 to assume a position indicative of the difference in magnetization of the electromagnets 27 and 28.

The magnetizable member 24 is actuated by electromagnets or electromagnetic field structures 27 and 28 to move the arm 21 about the shaft 22. The structure 27 is connected to a source of electromotive force 29, through a conductor 30, the needle 12, the contact member 15, a conductor 31 and a conductor 32.

The structure 28 is connected to a source of electromotive force 34, through a conductor 35, a conductor 36, the electromagnet 11, a conductor 37, the brush 8, the sleeve 7, the arm 5, the contact member 6 and a conductor 38.

In operation, the arm 5 makes contact with the member 6 for each of given units of watthours traversing the meter 1 and completes the circuit, above described, through the source 34, the electromagnet 11 and the structure 28. Thus, the electromagnet 11 co-operates with the uniformly revolving wheel 9 to induce a consequent magnetic pole on the rim 10 each time the electromagnet 11 is energized. At the same time, the structure 28 actuates the arm 21 in one direction. At the expiration of one half hour, or other predetermined interval, the induced magnetic poles on the rim 10 reach the polarized needle 12. As the poles and the needle approach each other, the unlike poles on the rim 10 and the needle 12 attract each other to cause the needle to swing into engagement with the contact member 15, thus closing the circuit of the source 29 and the structure 27 and moving the arm 21 in a direction opposite to that in which it is moved when the circuit of the source 34 is closed.

Hence, a curve inscribed by the pen 20 on the chart 19 will represent the average demand for preceding half hour intervals, ending at substantially any instant and without the error incident to the rise of the block time interval meters, as hereinbefore described.

A volt-ampere-hour meter may obviously be substituted for the watthour meter 1 to obtain the maximum average demand of apparent energy.

While I have shown and described a particular form of my invention, changes and modifications therein may be made without departing from the spirit and scope thereof, as set forth in the appended claims.

I claim as my invention:

1. In a measuring instrument, the combination with an indicating member and means for actuating the same, of a movable magnetizable member, an energy-responsive element, means responsive to said element for periodically affecting said actuating means and inducing a consequent magnetic pole on said magnetizable member and means responsive to movement of said magnetizable member for affecting the actuating means in accordance with the number and position of said poles.

2. In a measuring instrument, the combination with an indicating member and coils for actuating the same, a rotatable magnetizable member, an energy-responsive element, means responsive to said element for simultaneously periodically energizing one of said coils and inducing a consequent magnetic pole on said magnetizable member, and means responsive to movement of the magnetizable member for energizing another of said coils in accordance with the number and position of said poles.

3. In a measuring instrument, the combination with an indicating member and coils for actuating the same in opposite directions, of a constant-speed rotatable magnetizable member, an energy-responsive element, a magnet for inducing consequent poles on said magnetizable member, a local circuit including a switch actuated by said element for periodically energizing said magnet and one of said coils, another local circuit including a switch actuated in accordance with the number and position of said poles to energize the other of said coils, and means for removing said poles from the magnetizable member after they have actuated said second switch.

4. In combination in a measuring instrument, indicating means, and means including magnetic storing means responsive to variations in a quantity to be measured and operative to electrically transmit impulses to the indicating means in accordance with said variations at predetermined time intervals different from the occurrence thereof.

5. In combination in a measuring instrument, indicating means, and means including magnetic storing means responsive to variations in a quantity to be measured and operative to transmit electrical impulses to the indicating means in accordance with said variations at predetermined time intervals subsequent thereto.

6. In combination in a measuring instrument, indicating means, means responsive to variations in a quantity to be measured, and means including magnetic storing means affected by said variation-responsive means to electrically transmit operating impulses to the indicating means in accordance with said variations at predetermined time intervals after the occurrence thereof.

7. In combination in a measuring instrument, indicating means, a time responsive means including magnetic storing means and an intermittently operating element responsive to variations in a quantity to be measured, and means co-operating with said time-responsive means and affected in accordance with said variations at predetermined time intervals subsequent thereto to electrically transmit intermittent operating impulses to the indicating means in accordance with said variations.

8. In combination in a measuring instrument, indicating means, a magnetizable time-responsive element, means for inducing consequent magnetic poles on said element in accordance with variations in a quantity to be measured, and means actuated by said poles for transmitting operating impulses to the indicating means in accordance with said variations in predetermined subsequent time-phase relation to said time-responsive element.

In testimony whereof, I have hereunto subscribed my name this 27th day of November, 1922.

LEWIS WARRINGTON CHUBB.